April 18, 1939.  E. G. WARE  2,155,108

PUMPING GEAR

Filed Aug. 17, 1938

INVENTOR.
ELMER G. WARE
BY Munn, Anderson & Liddy
ATTORNEYS.

Patented Apr. 18, 1939

2,155,108

UNITED STATES PATENT OFFICE 2,155,108

PUMPING GEAR

Elmer G. Ware, Bakersfield, Calif.

Application August 17, 1938, Serial No. 225,325

5 Claims. (Cl. 74—219)

My invention relates to improvements in a pumping gear, and it consists of the combinations, constructions and arrangements hereinafter described and claimed.

An object of my invention is to provide a pumping gear which will reciprocate a connecting rod rapidly in one direction and more slowly in the opposite direction. The device may be operatively connected to an oil well pump for causing the connecting rod to slowly move when lifting the sucker rods connected with the oil pump. The means for moving the connecting rods slowly in one direction will also materially increase the lifting force exerted on the rods during this movement. Less force is applied to the rods during the return movement and the rods are also moved more rapidly.

The device may be adjusted for changing the ratio between the rapid and the slow strokes and for also changing the force applied to the two strokes. The invention is simple in construction and is durable and efficient for the purpose intended.

Other objects and advantages will appear in the following specification, and the novel features of the device will be particularly pointed out in the appended claims.

Figure 1:
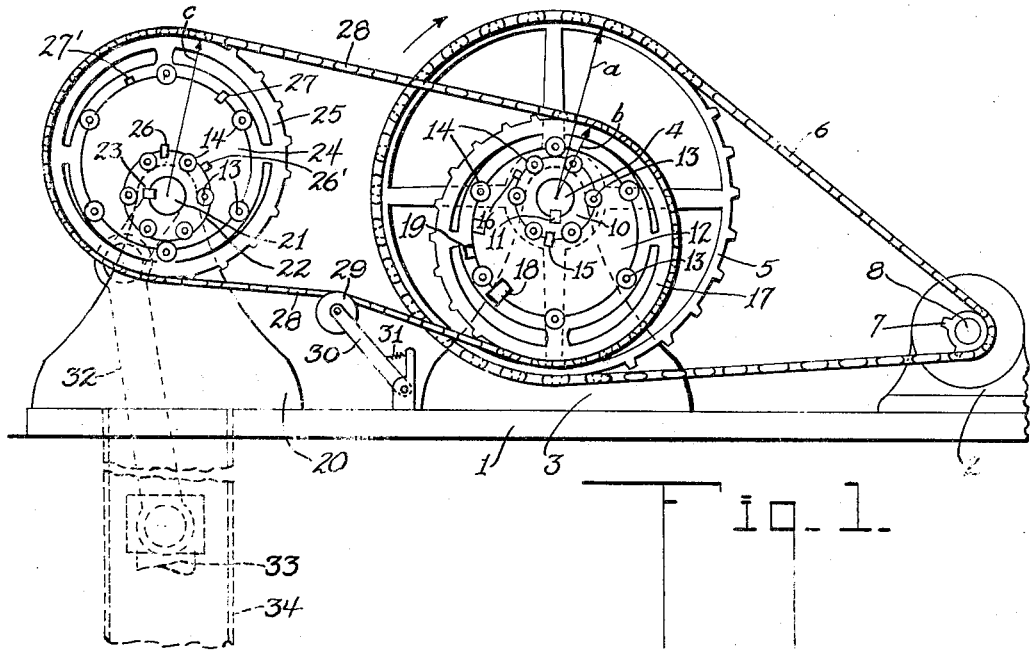
Figure 2:
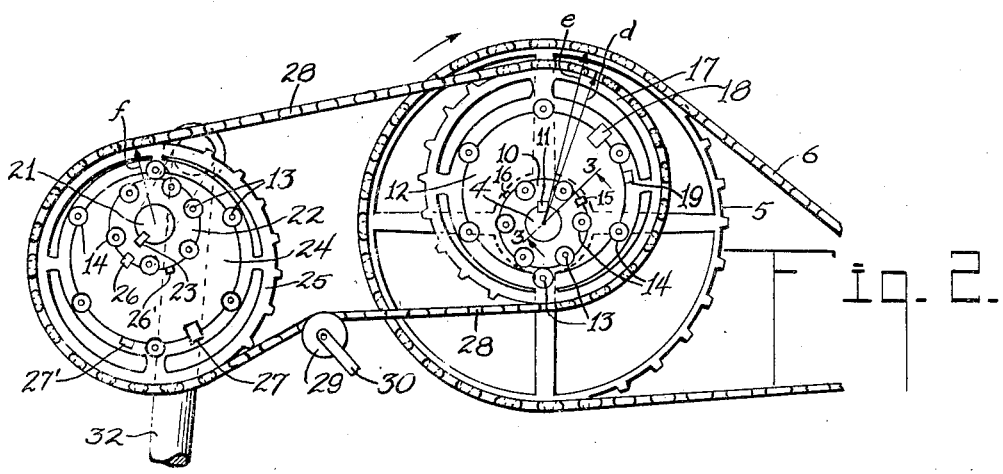
Figure 3:
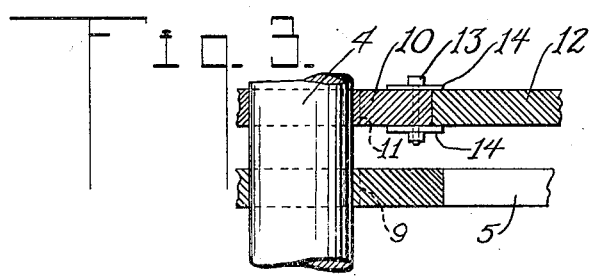

My invention is illustrated in the accompanying drawing forming a part of this application, in which Figure 1 is a side elevation of the device showing the parts at the start of the lifting stroke;

Figure 2 is a view similar to Figure 1 showing the parts disposed 180° from that shown in Figure 1; and Figure 3 is a section along the line 3—3 of Figure 2.

In carrying out my invention, I provide a base 1 with a motor 2 placed thereon. A frame 3 is also positioned on the base and rotatably carries a shaft 4 on which a large sprocket gear 5 is keyed. A sprocket chain 6 connects the sprocket gear 5 to a sprocket 7 mounted on a motor shaft 8. Figure 3 shows how the large sprocket gear 5 is keyed to the shaft 4 at 9. Figure 3 further shows a hub 10 keyed to the shaft 4 at 11.

The hub 10 is concentric with the shaft 4 and carries an eccentric disc 12. The disc 12 is adjustably mounted on the hub 10 and is held in place by bolts 13 passed through the hub, see Figure 3, and clamping washers 14 to the hub 10 and disc 12. The disc 12 is also keyed to the hub 10 at 15. Figure 1 shows additional key slots 16 in the disc 12 for the purpose of adjusting the eccentric disc 12 on the hub and thus changing its position for a purpose hereinafter described.

An eccentric sprocket 17, smaller in diameter than the large sprocket 5, is eccentrically mounted on the eccentric disc 12 and is held in place by additional bolts and washers 13 and 14, in the same manner as the disc 12 is secured to the hub 10. The eccentric sprocket 17 is keyed to the eccentric disc 12 by a key 18. Additional keyways 19 are provided in the sprocket 17 for altering the position of the sprocket on the disc for a purpose to be described later.

A frame 20, similar to the frame 3, is mounted on the base 1 and carries a crank shaft 21 upon which a hub 22 is mounted. The hub is keyed to the shaft at 23 and in turn is connected to an eccentric disc 24 which is similar to the disc 12. Bolts and washers similar to those shown at 13 and 14 secure the disc 24 to the hub 22. An eccentric sprocket 25, similar to the sprocket 17, is secured to the disc 24 by additional bolts and washers 13 and 14. The disc 24 is keyed to the hub 22 at 26 and the sprocket 25 is keyed to the disc 24 by a key 27. Additional keyways 26' and 27' are provided in the disc 24 and in the sprocket 25 for permitting adjustment between the various parts. The sprocket 17 is connected to the sprocket 25 by a sprocket chain 28. Figure 1 shows an idler pulley 29 mounted on an arm 30 and yieldingly held against the chain 28 by a spring 31 for automatically taking up the slack.

In Figure 1, I show the shaft 21 as a crank shaft and as being connected to a rod or link 32. The link 32 is operatively connected to a line of sucker rods 33 in the usual manner. The rods 33 in turn will actuate a pump, not shown, for pumping oil through a casing 34.

From the foregoing description of the various parts of the device, the operation thereof may be readily understood.

When the parts are in the position shown in Figure 1, the chain 6 will exert a rotative force on the large sprocket 5 to rotate the shaft 4. The radius of the sprocket 5 is indicated by the long arrow $a$ and this constitutes one arm of a lever. The position of the eccentric sprocket 17 is such that the radius indicated by the arrow $b$ is short and this radius constitutes the other arm of the lever whose fulcrum is the shaft 4. The function of such a lever is to cause the short arm (arrow $b$) to move through a less distance than the long arm (arrow $a$) and create a force on the chain 28 greater than the force moving the chain 6. The chain 28 in turn exerts a rotative force on the sprocket 25 along the radius line indicated by the long arrow *c*. The peripheral rotation of the sprocket 17 in Figure 1, at the portion near the small arrow *b* will be slower than the peripheral rotation of the sprocket 5 at the portion near the arrow *a*. It will also be noted that the slower moving portion of the gear 17 near the small arrow *b*, although greater force than that delivered by the chain 6 will build up this force to a still greater extent on the crank shaft 21 due to the chain 28 acting on the long side of the sprocket 25 as shown by the arrow *c*. The parts will rotate through substantially one-half of a circle with a greater lifting force being exerted on the rods 33 than is created by the motor during this portion of the cycle due to the particular arrangement of the parts.

In Figure 2, I show the sprockets rotated through an arc of 180°. The rods 33 have started on their down stroke. The long arrow *d*, in Figure 2, corresponds to the arrow *a* and constitutes one arm of a lever that rocks a second arm (arrow *e*) of substantially the same length as the arrow *d*. The chain 28 will therefore be moved substantially at the same speed as the chain 6 and there will be no building up of any forces. The chain 28 exerts a force on the sprocket 25 designated by a short arrow *f* and since this portion of the sprocket is so close to the crank shaft 21, the shaft will be more rapidly rotated through this portion of the cycle than the shaft 4. The force created by the crankshaft will be less during this portion of the cycle, but since the rods 33 are moving downward, less force is required. The sprockets have been arranged to cause the crankshaft to slowly move the rods 33 upwardly while applying a greater force than that delivered by the motor because of this slow movement and then to cause the crankshaft to rapidly move the rods downwardly at a corresponding decrease of the force.

It is possible by rotating the eccentric discs and sprockets with respect to each other and about the hubs to change the timing of the stroke to any desired ratio. This is the reason why additional keyways are provided in the discs and eccentric sprockets. The device may be used for purposes other than operating an oil well pump.

While I have shown only the preferred form of my invention, it should be understood that various changes or modifications may be made within the scope of the appended claims without departing from the spirit of the invention.

I claim:

1. A pumping gear comprising a shaft, a large sprocket driving gear concentrically mounted on the shaft, a smaller sprocket gear eccentrically connected to the shaft, a driven crank shaft, a third sprocket gear eccentrically mounted on the crank shaft and being connected to the second sprocket gear by a chain, pump rods connected to the crank shaft, said second sprocket gear being arranged on the shaft so that the driving side of the chain will be disposed close to the shaft when the rods and crank shaft are at the start of their upstroke, the driving side of the chain being connected to the portion of the third sprocket gear that is furtherest removed from the crank shaft when the parts are in this position.

2. A pumping gear comprising a shaft, a large sprocket gear concentrically mounted thereon, a hub keyed to the shaft, a disc eccentrically mounted on the hub and being adjustably held in the desired position, a small sprocket eccentrically mounted on the disc and being adjustably held in the desired position, a driven shaft, a hub keyed to the second shaft, a disc adjustably and eccentrically secured to the second hub, a third sprocket gear having a diameter equal to the second sprocket gear, said third sprocket being adjustably and eccentrically mounted on the second disc, and a sprocket chain connecting the second and third sprockets together.

3. In combination, a shaft, a large sprocket gear mounted thereon, a driving sprocket chain for rotating the gear and shaft, a small sprocket gear eccentrically mounted on the shaft, a crank shaft, a third sprocket gear eccentrically mounted on the crank shaft, a sprocket chain connecting the second and third sprocket gears together so that the portions furtherest removed from their shafts will be 180° apart, a pump mechanism connected to the crank shaft and being arranged to start on its lifting stroke when the long side of the third sprocket gear is being driven by the short side of the second sprocket gear, whereby a slow powerful stroke is delivered to the pump mechanism.

4. In combination, a shaft, a large sprocket gear mounted thereon, a driving sprocket chain for rotating the gear and shaft, a small sprocket gear eccentrically mounted on the shaft, a crank shaft, a third sprocket gear eccentrically mounted on the crank shaft, a sprocket chain connecting the second and third sprocket gears together so that the portions furtherest removed from their shafts will be 180° apart, a pump mechanism connected to the crank shaft and being arranged to start on its lifting stroke when the long side of the third sprocket gear is being driven by the short side of the second sprocket gear, whereby a slow powerful stroke is delivered to the pump mechanism, and an idler for automatically taking up slack in the second chain.

5. In a device of the type described, a shaft, a hub mounted thereon, a disc eccentrically mounted on the hub, bolts and washers carried by the hub and securing the disc thereto, an adjustable key for locking the disc to the hub for causing them both to rotate as a unit, a sprocket gear eccentrically mounted on the disc, bolts and washers carried by the disc and securing the sprocket gear thereto, and an adjustable key for locking the sprocket gear to the disc for causing them both to rotate as a unit.

ELMER G. WARE.